United States Patent [19]

Uematsu et al.

[11] Patent Number: 4,735,288
[45] Date of Patent: Apr. 5, 1988

[54] DETACHABLY ATTACHING MECHANISM FOR CUP OF LUBRICATOR OR FILTER USED WITH AIR-ACTUATED DEVICE

[75] Inventors: Eiji Uematsu, Nagoya; Shunji Tsukamoto, Inazawa; Fumika Hayashi, Toki; Kouichi Miyake, Kani; Toshiyuki Watanabe, Minokamo, all of Japan

[73] Assignee: CKD Kabushiki Kaisha, Aichi, Japan

[21] Appl. No.: 3,773

[22] Filed: Jan. 16, 1987

[30] Foreign Application Priority Data

Jan. 24, 1986 [JP] Japan .................. 61-9474[U]
Feb. 17, 1986 [JP] Japan .................. 61-21264[U]
Apr. 4, 1986 [JP] Japan .................. 61-50950[U]

[51] Int. Cl.$^4$ .......................... F16N 7/34; F16B 2/00; F16D 1/00
[52] U.S. Cl. .................. 184/55.1; 184/55.2; 403/348; 403/326
[58] Field of Search .................. 184/55.1, 55.2, 57, 184/58; 403/11, 315, 319, 326, 348, 349; 261/DIG. 35

[56] References Cited

U.S. PATENT DOCUMENTS

| | | | |
|---|---|---|---|
| 3,214,054 | 10/1965 | Poethig | 184/55.2 |
| 3,696,889 | 10/1972 | Brake | 184/55.2 |
| 3,885,648 | 5/1975 | Beziat | 403/349 |
| 4,215,790 | 8/1980 | Ribble | 184/55.2 |
| 4,429,938 | 2/1984 | Flor | 403/349 |
| 4,491,060 | 1/1985 | Boski | 403/349 |
| 4,585,369 | 4/1986 | Manesse | 403/326 |

FOREIGN PATENT DOCUMENTS

59-81850 2/1984 Japan .
1083701 9/1967 United Kingdom ............... 184/55.2

Primary Examiner—Carlton R. Croyle
Assistant Examiner—Jane E. Obee
Attorney, Agent, or Firm—Robert E. Burns; Emmanuel J. Lobato

[57] ABSTRACT

A detably attaching mechanism for a cup of a lubricator or a filter used with an air-actuated device comprising such cup containing therein a quantity of lubrication oil or filter elements, means to supply a quantity of lubrication oil from the cup into an air stream flowing from an inlet to an outlet or to introduce the air stream through the filter elements contained within the cup, a cover mounted on the cup and a protective cylinder mounted around the cup, characterized by that the protective cylinder is provided on its outer periphery with a locking piece adapted to have its front or top end being outwardly tilted away from the outer periphery of the protective cylinder by depressing its rear or lower end and this locking piece is mounted with interposition of an elastically flexible leg on the outer periphery of the protective cylinder and that the cover is provided in its outer periphery with receiving means adapted to receive the front or top end of the locking piece upon completion of attachment of the cup and the protective cylinder to the cover and thereby to prevent rotation of the cup and the protective cylinder relative to the cover.

5 Claims, 9 Drawing Sheets

DETACHABLY ATTACHING MECHANISM FOR CUP OF LUBRICATOR OR FILTER USED WITH AIR-ACTUATED DEVICE

BACKGROUND OF THE INVENTION (a) Field of the Invention:

The present invention relates to a pneumatic device such as lubricator adapted to atomize lubrication oil into an air stream circulating in an air-actuated device or to a filter for removal of dust or moisture from such air stream, and, more particularly, to a detachably attaching mechanism for a cup containing therein a quantity of lubrication oil or filter elements.

(b) Description of the Prior Art:

The lubricator, for example, usually comprises a cover provided with a substantially horizontal air conduit including an orifice, said air conduit extending through the cover, a cup for storage of oil and a protective cylinder mounted around said cup to avoid a danger that fragments of the cup might spatter when the cup possibly bursts under an excessive pressure built up therein, said cup and said protective cylinder being attached to the lower side of said cover, so that a difference between a pressure prevailing within the cup and a pressure prevailing within the orifice causes a quantity of oil contained within the cup to be sucked up and then to be atomized through the orifice into the air stream flowing therethrough. In such lubricator, there has conventionally been used the detachably attaching mechanism for the cup comprising: a plurality of locking projections equiangularly formed on the inner periphery of a circular connector ring defining the lower end of the cover along an open edge, a plurality of collar sections equiangularly disposed along and projecting from the outer peripheries of the respective open edges of both the cup and the protective cylinder, notches and projections formed in the cup and on the protective cylinder, respectively, to angularly position the cup and the protective cylinder so as to align the respective collar sections of the former with the associated collar sections of the latter, wherein the collar sections of the cup and the protective cylinder are fitted into the connector ring through the corresponding spaces defined between the respective pairs of adjacent locking projections of the cover and thereafter the cup and the protective cylinder are rotated together by a predetermined angle to lock the respective collar sections on the corresponding locking projections of the cover, a locking piece provided on the outer periphery of the protective cylinder, and means provided in the cover to receive said locking piece, preventing the cup and the protective cylinder from being rotated relative to the cover.

The aforementioned means to prevent the cup and the protective cylinder from being rotated relative to the cover has considered already been disclosed, for example, by Japanese Utility Model Unexamined Publication No. 59-81850, in which said means comprises a cut away window formed in the open edge of the protective cylinder, a locking piece extending from the bottom edge of said cut away window and having its front or top end depressible towards the centre of the protective cylinder against its own elasticity like a lever having said bottom side of the cut away window as a fulcrum, and a receiving groove correspondingly formed in the inner periphery of the connector ring of the cover along the open edge thereof, wherein the cup and the protective cylinder are fitted into the connector ring as the front or top end of the locking piece is slipped along the inner periphery of the connector ring, then the cup and the protective cylinder are rotated by a predetermined angle until the locking piece is received in the receiving groove under a restoring elasticity of the locking piece itself and thereby further rotation of the cup and the protective cylinder is prevented, and, to detach the cup, the locking piece is disengaged from the receiving groove by rotating the cup and the protective cylinder relative to the cover while said locking piece is held depressed. With such mechanism of well known art, the front or top end of the locking piece must be slipped along the inner periphery of the connector ring to achieve attachment and tilted towards the centre of the protective cylinder to disengage the locking piece from the receiving groove, so that there must be provided a relatively large gap between the inner periphery of the connector ring and the outer periphery of the protective cylinder. Such requirement disadvantageously results in a large diameter of the connector ring and therefore a bulky configurations.

SUMMARY OF THE INVENTION

According to the present invention, a locking piece is mounted by an elastically flexible leg on the outer periphery of the protective cylinder, said locking piece having a front or top end adapted to be outwardly tilted away from the outer periphery of the protective cylinder by depressing a rear or lower end thereof while there is provided means on the outer periphery of the cover to receive said front or top end of the locking piece upon attachment of the cup and the protective cylinder to the cover and thereby to prevent the cup and the protective cylinder from being further rotated relative to the cover. Notches and projections correspondingly formed in and on the cup and the protective cylinder, respectively, serve to position these cup and protective cylinder with their associated collar sections being aligned with one another. The cup and the protective cylinder are assembled in such positioned and aligned position. Then, the collar sections of the cup and the protective cylinder thus assembled are fitted into the connector ring through the corresponding spaces defined between the respective pairs of adjacent locking projections formed on the cover so that the front or top end of the locking piece rides on the outer periphery of the cover against an elasticity of the elastically flexible leg, and thereafter the cup and the protective cylinder are rotated together by a predetermined angle relative to the cover. As a result, the collar sections are engaged with the associated locking projections to effect the attachment of the cup and the protective cylinder to the cover and simultaneously the front or top end of the locking piece is biased under a restoring elasticity of the elastically flexible leg into the receiving means formed in the outer periphery of the cover to prevent the cup and the protective cylinder from being rotated relative to the cover and to hold the cup and the protective cylinder in their attached positions. To detach the cup, the rear or lower end of the locking piece is depressed so as to tilt the front or top end thereof away from the outer periphery of the protective cylinder and thereby to disengage the locking piece from the receiving means, then the cup and the protective cylinder are rotated relative to the cover, the respective collar sections are pulled out from the cover through the corresponding spaces defined between the respective pairs of adjacent locking projections and thus the cup and the protective cylinder are completely detached from the cover. The essential feature of the present invention that the locking piece is brought into engagement with the receiving means formed in the outer periphery of the cover eliminates the demand for a gap between the inner periphery of the connector ring and the outer periphery of the protective cylinder which has been provided in the prior art and permits the connector ring of the cover to be kept small in a diameter, thus avoiding a bulky configuration as has been the case in the prior art. Furthermore, operation of depressing the locking piece can be easily performed just as in operation of a lever, since the front or top end of the locking piece can be tilted simply by depressing the rear or lower end thereof.

BRIEF DESCRIPTION OF THE DRAWINGS

FIGS. 1 through 3B illustrate a first embodiment of the present invention as used in a lubricator, of which FIG. 1 is a partially broken disassembled perspective view, FIG. 2 is a longitudinal sectional view and FIGS. 3A and 3B is a partial longitudinal sectional Views showing a manner in which a locking piece is fitted into and disengaged from a receiving groove of a cover;

FIGS. 4 and 5 illustrate a second embodiment of the present invention as used in a lubricator, of which FIG. 4 is a partially broken disassembled perspective view and FIG. 5 is a longitudinal sectional view; and FIGS. 6 through 9 illustrate a third embodiment of the present invention, of which FIG. 6 is a longitudinal sectional view, FIG. 7 is a disassembled perspective view, FIG. 8 is a longitudinal sectional view showing a manner in which an insertion ring is fitted into the protective cylinder and FIG. 9 is a partially broken frontal view showing a state in which the protective cylinder thus carrying the insertion ring has been around the cup.

DESCRIPTION OF THE PREFERRED EMBODIMENT

Figure 1:
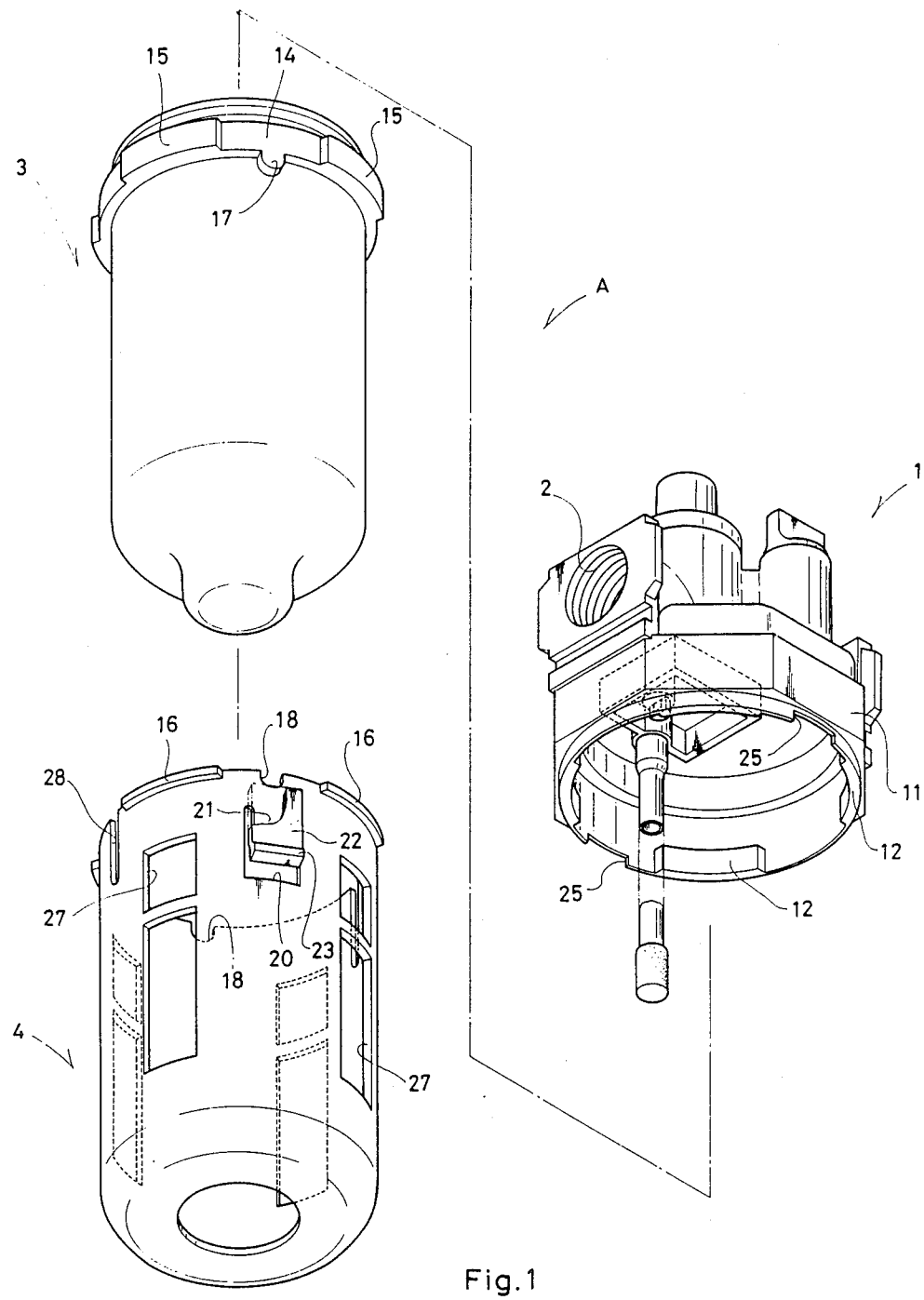
Figure 2:
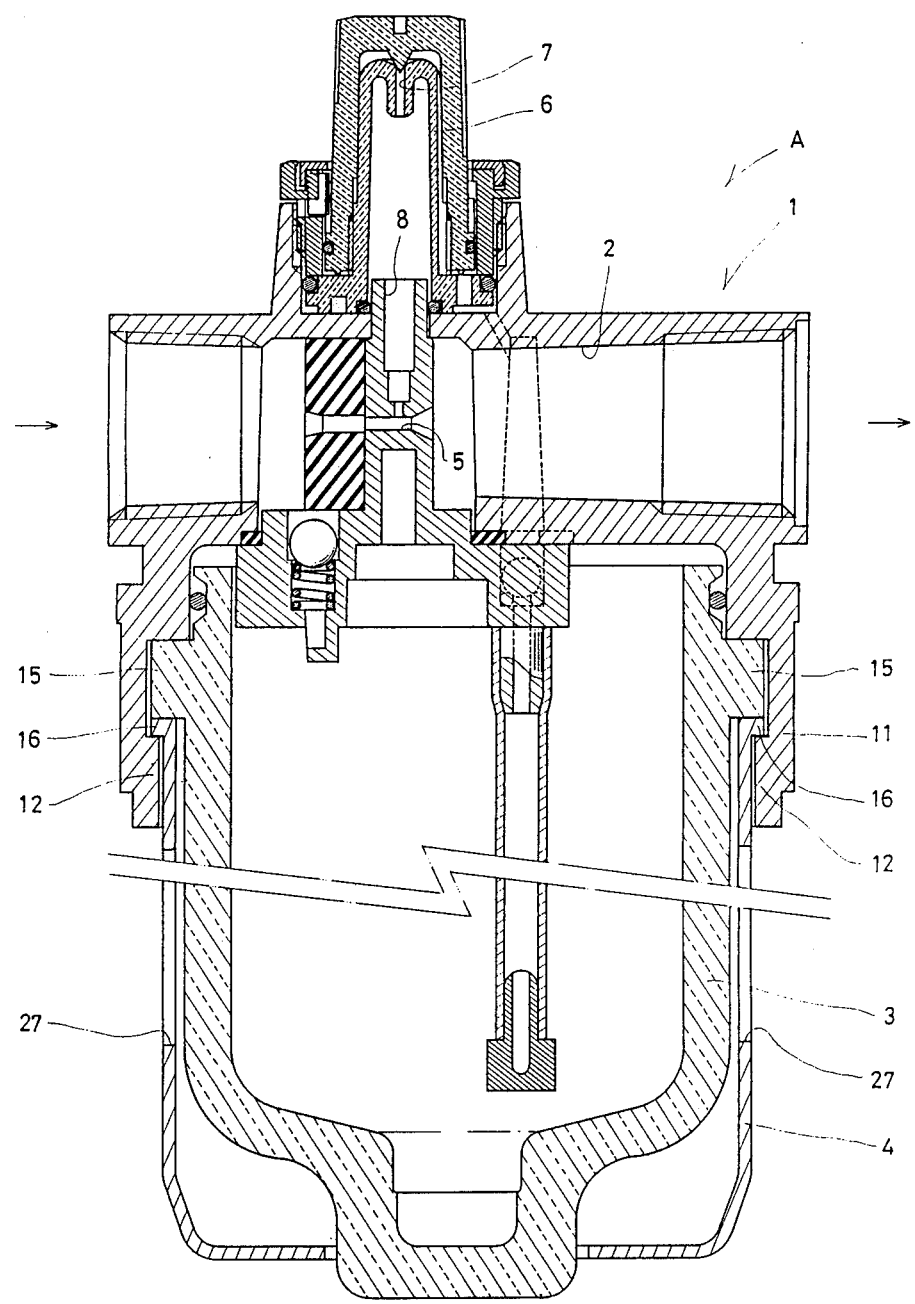

Now a first embodiment of the present invention used with a lubricator A will be described with reference to FIGS. 1 through 3B.

The lubricator A shown comprising a cover 1 provided with an air conduit 2 horizontally extending therethrough, a transparent cup 3 made of polycarbonate mounted on the under side of the cover 1 for storage of oil and a protective cylinder 4 of synthetic resin such as nylon mounted around said cup 3 for protection of the latter so that a difference between a pressure prevailing within the cup 3 and a pressure prevailing within an orifice 5 arranged within the air conduit 2 causes a quantity of oil contained within the cup 3 to be sucked up above a drop cylinder 6, then to be dropped through a drop hole 7 formed through the top wall of the drop cylinder 6 down into the drop cylinder 6 and to be atomized through a supply hole 8 and the orifice 5 into an air stream.

Then a mechanism for detably attaching the cup 3 together with the protective cylinder 4 to the cover 1 will be described.

The cover 1 has a lower portion defined by a cylindrical inner periphery and a regular octagonal outer periphery, and a lower end thereof is so machined to provide a circular connector ring 11. This connector ring 11 is formed along its inner periphery adjacent its open edge with four locking projections 12 spaced successively from one another by an angular distance of 90° and, on a flange 14 circumferentially extending around the cup 3 at a level slightly lower than the open edge thereof, there are provided four collar sections 15 successively spaced from one another similarly by an angular distance of 90° and radially projecting therefrom outwards. Further, another set of four collar sections 16 are correspondingly arrange at angular intervals of 90° around the open edge of the protective cylinder 4. The flange 14 of the cup 3 has a pair of positioning projections 17 formed in the under side thereof, each of these projections 17 being disposed intermediately of the adjacent collar sections 15, 15 and spaced from the other projection 17 by an angular distance of 180°. Correspondingly, the protective cylinder 4 has a pair of notches 18 along the open edge thereof adapted to receive the associated projections 17, each of these notches 18 being similarly disposed intermediately of the adjacent collar sections 16, 16 and spaced from the other notch 18 by an angular distance of 180°.

At a level slightly lower than one of said notches 18, said protective cylinder 4 has a rectangular throughhole 20 formed through the side wall thereof and within the area of this throughhole 20, an elastically flexible leg 21 is formed integrally with said side wall of the protective cylinder 4 so as to extend from the side of said through-hole 20 adjacent the open edge of the protective cylinder 4 towards the bottom thereof. A projecting end of this elastically flexible leg 21 is bent obliquely outwards. A locking piece 22 integral at its rear or lower end with the projecting end of the elastically flexible leg 21 extends along the top surface of said elastically flexible leg 21 towards the open edge of the protective cylinder 4. A depressible portion 23 projects from said rear or lower end of the locking piece 22 obliquely outwards. There are formed a pair of receiving grooves 25, 25 in the open edge of said connector ring 11 of the cover 1, each of these receiving grooves 25, 25 being disposed intermediately of the adjacent locking projections 12, 12 and spaced from the other receiving groove 25 by an angular distance of 180° so that the front or top end of said locking piece 22 is received in any one of said receiving grooves 25, 25.

The protective cylinder 4 further includes a plurality of viewing-windows 27 formed through the side wall thereof for visual observation of a quantity of oil contained within the cup 3 and slits 28 longitudinally extending from the open edge of the protective cylinder 4 so that the open edge may be forcibly diameter-reduced to be easily fitted into the connector ring 11 of the cover 1 when the protective cylinder 4 has been expanded due to moisture content.

Now a manner in which the cup 3 is attached step by step to the protective cylinder 4 will be described. The protective cylinder 4 is fitted around the cup 3 with the projections 17 of the latter being received by the associated notches 18 so that the collar sections 15 of the cup 3 are aligned with the associated collar sections 16 of the protective cylinder 4. The collar sections 15 of the cup 3 and the collar sections 16 of the protective cylinder 4 thus engaged tother in alignment with each other are fitted into the connector ring 11 of the Cover 1 through the associated spaces defined between respective pairs of adjacent locking projections 12 of the connector ring 11, so that the top end of the locking piece 22, forcing the elastically flexible leg 21 against its own elasticity to yield, rides on the outer periphery of the circular open edge of the connector ring 11. Then, the collar sections 16 of the protective cylinder 4 are locked on the associated locking projections 12 by rotating the cup 3 together with the protective cylinder 4 by a predetermined angle. In this manner, the cup 3 and the protective cylinder 4 are effectively attached to the cover 1 and simultaneously the top end of the locking piece 22 is fitted into the associated receiving groove 25 of the cover 1, as seen in FIG. 3A, under a restoring elasticity of the elastically flexible leg 21, thereby the cup 3 and the protective cylinder 4 are prevented from further rotation and held in their attached positions.

Figures 3A, 3B:
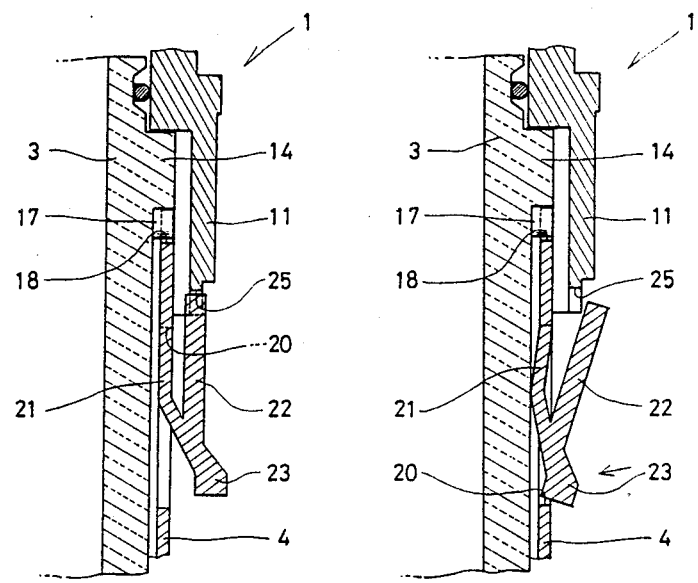

To detach the cup 3, conversely, as seen in FIG. 3B, the locking piece 22 may be tilted by depressing the depressible portion 23 so as to separate the top end thereof away from the outer periphery of the protective cylinder 4 and simultaneously to disengage the top end of the locking piece 22 from the receiving groove 25. From such condition, the cup 3 and the protective cylinder 4 are rotated to an angular position at which the collar sections 15 and 16 lie intermediately of the respective pairs of adjacent locking projections 12. Thereafter, the protective cylinder 4 may be pulled out from the cover 1 as the collar sections 16 pass through the respective spaces between the respective pairs of adjacent locking projections 12 and then the cup 3 may be pulled out from the cover 1 as the collar sections 15 similarly pass through the associated spaces between the respective pairs of adjacent locking projections 12.

Figure 4:
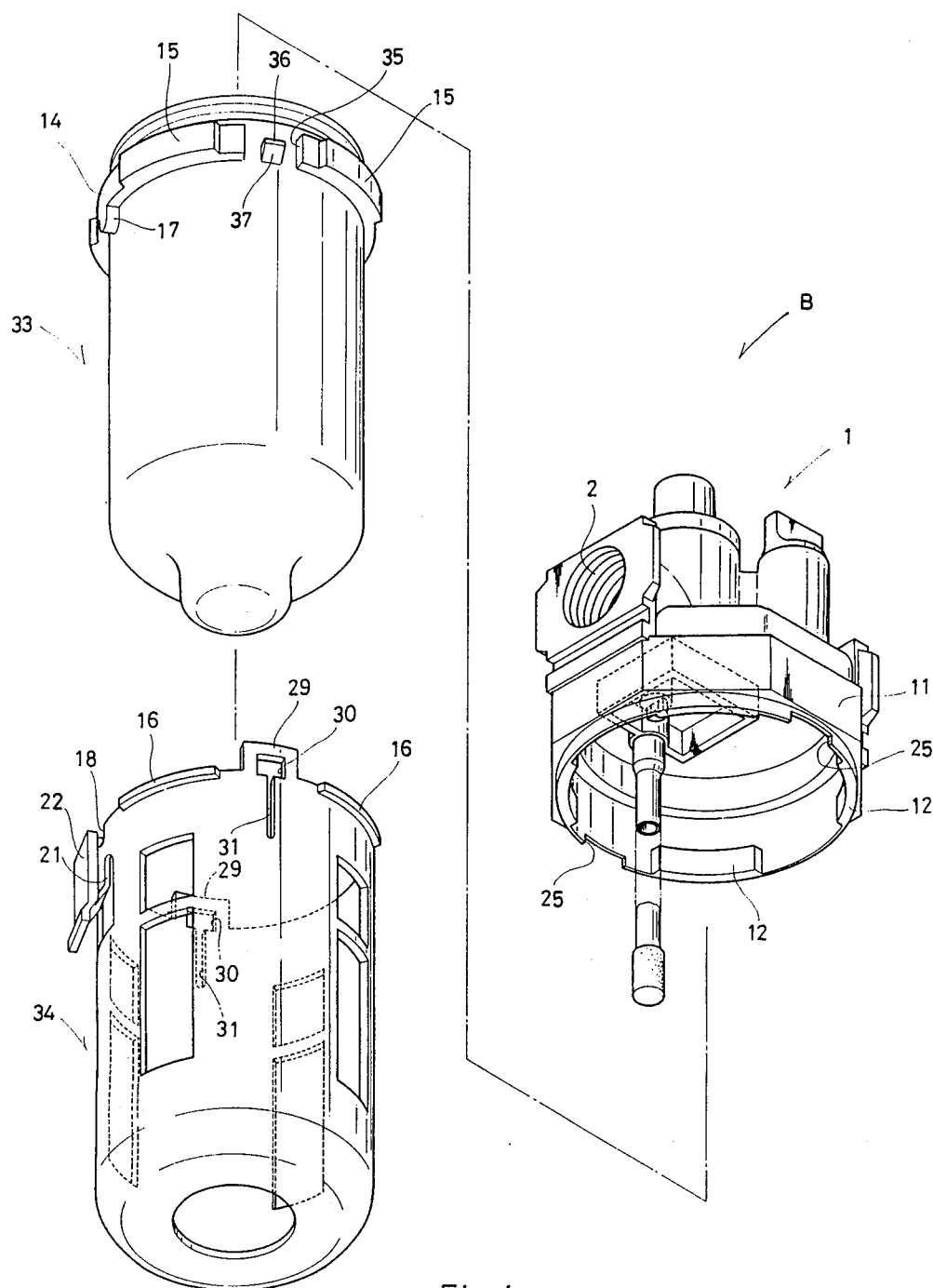
Figure 5:
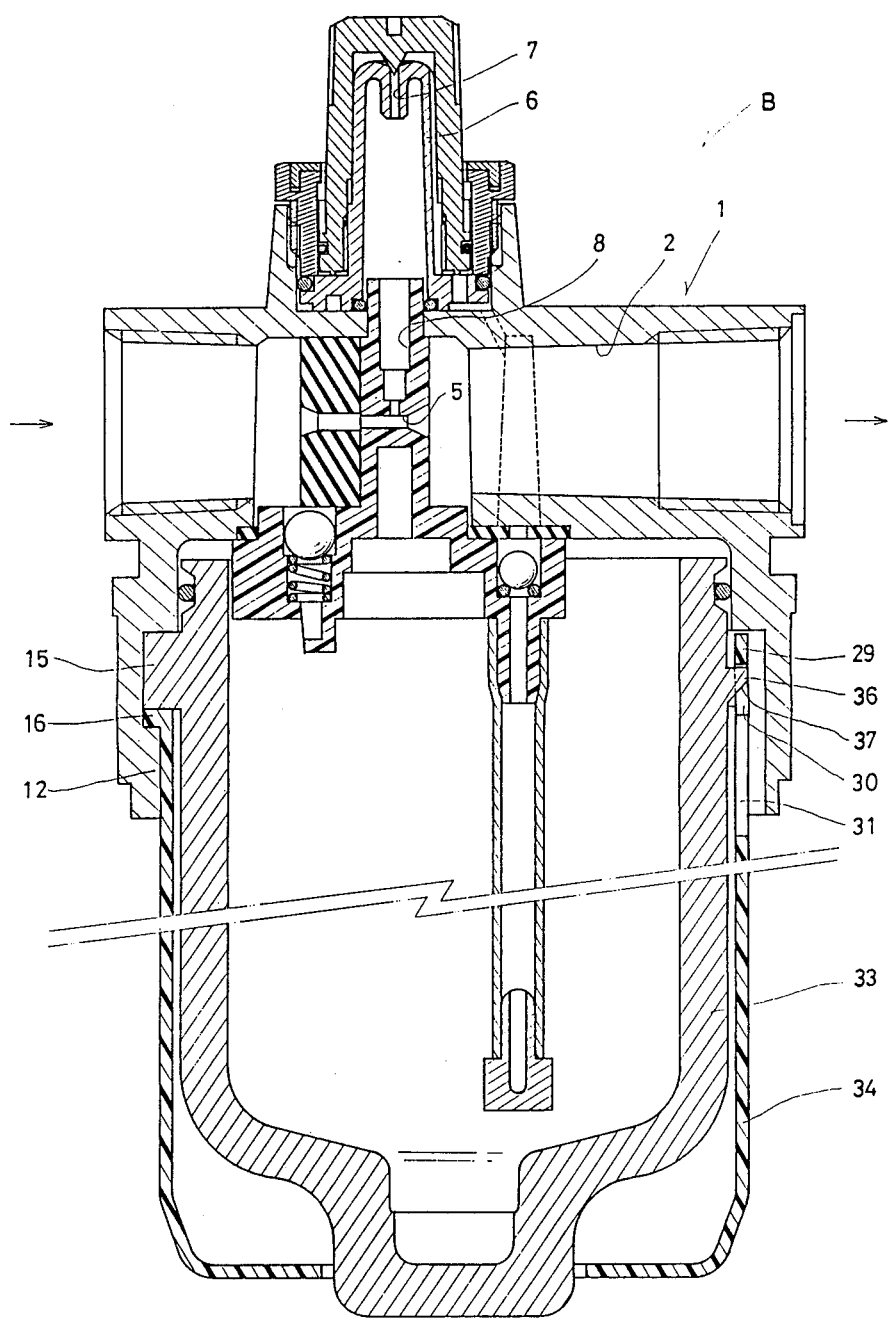
Figure 6:
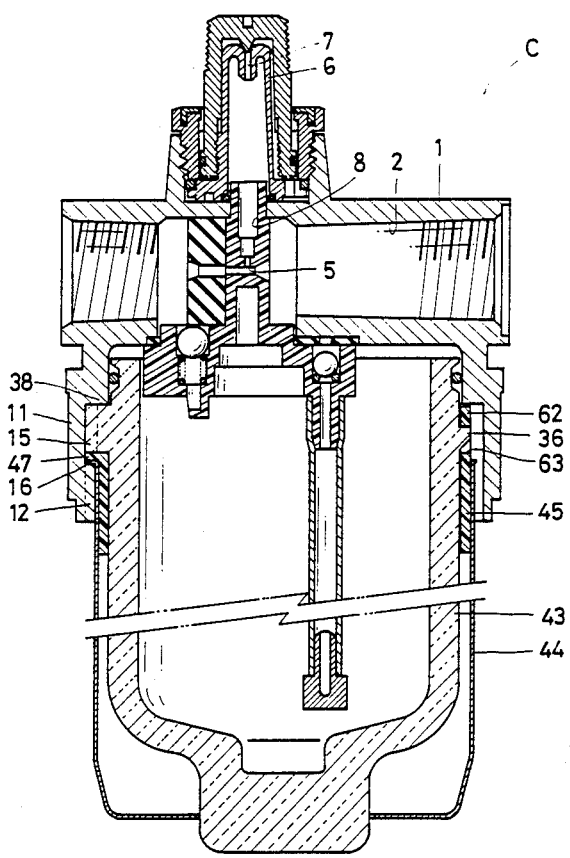
Figure 7:
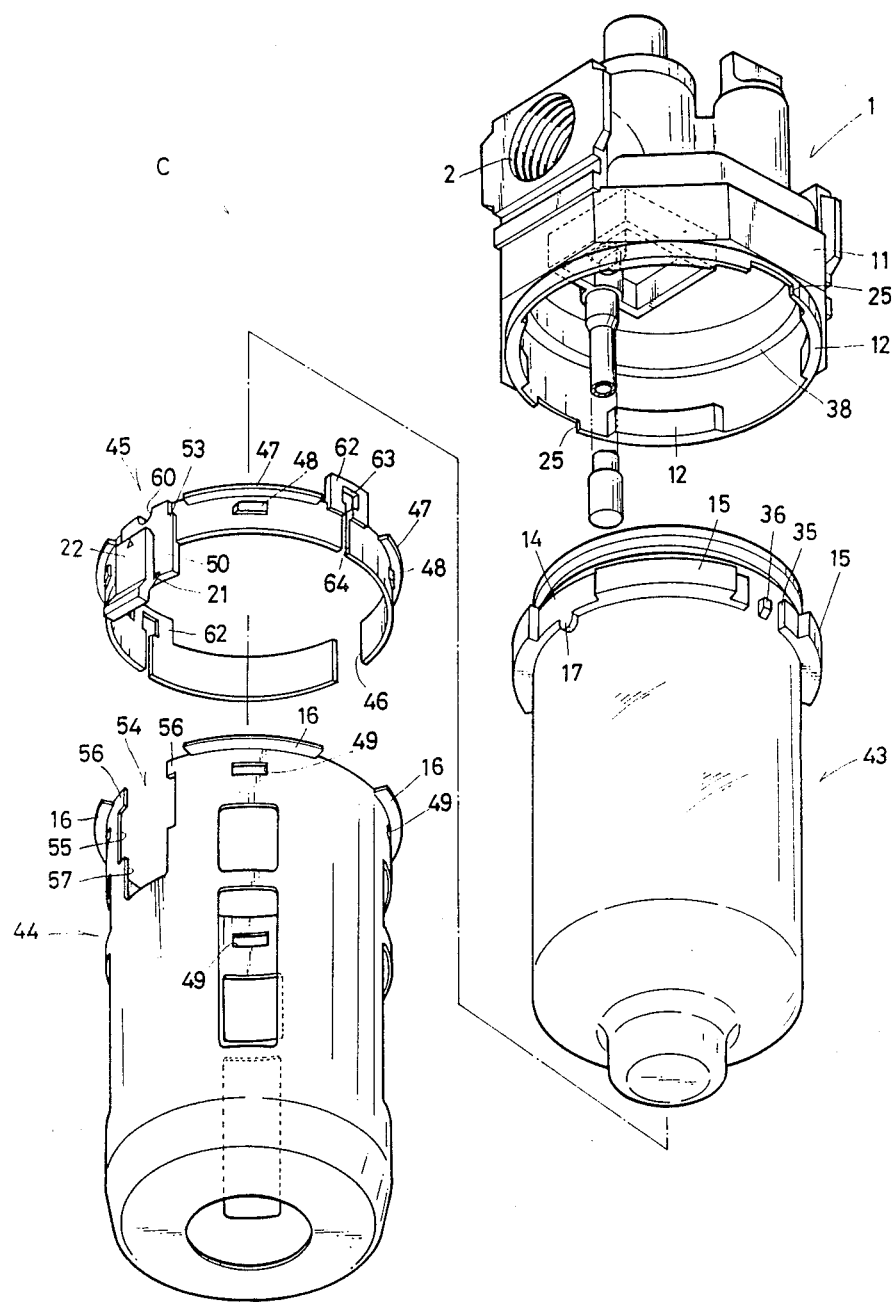

A second embodiment of the present invention incorporated into a lubricator B will be described with reference to FIGS. 4 and 5. At two of a total of four positions defined between respective pairs of adjacent collar sections 15, 15 formed on a flange 14 circumferentially extending around a cup 33 that are displaced 90° with respect to a positioning projection 17, there are respectively defined grooves 35 and, within an extension of each said groove 35, there is formed a projection 36 including a surface 37 sloped towards the bottom of the cup 33. Correspondingly, at two of a total of four positions defined between respective pairs of adjacent collar sections 16, 16 formed on the open edge of a protective cylinder 34 that are displaced 90° with respect to a positioning notch 18, there are formed elastic connector pieces 29 axially extending upwards, respectively. Each of the elastic connector pieces 29 is provided with an opening 30 to receive the associated one of said projections 36 and further with a slit 31 axially extending continuously from the associated opening 30 towards the bottom of the protective cylinder 34 to facilitate elastic deformation of this elastic connector piece 29.

Now a manner in which the cup 33 is attached step by step to the protective cylinder 34 as well as to the cover 1 will be described.

First, the protective cylinder 34 is fitted around the cup 33 with the respective elastic connector pieces 29 being aligned with the associated projections 36. At the end of such fitting process, the front or top ends of the elastic connector pieces 29 are elastically deformed to ride on the sloped surfaces 37 of the associated projections 36 and simultaneously to enter the associated grooves 35. When the collar sections 16 of the protective cylinder 34 bear against the associated collar sections 15 of the cup 33, the projections 36 are fit into the associated receiving openings 30, of the elastic connector pieces 29, as seen in FIG. 5, and, at the same time, the positioning projections 17 are engaged with the associated notches 18 so that the cup 33 and the protective cylinder 34 are integrally assembled with the respective collar sections 15 and 16 being in alignment with one another.

The collar sections 15 and 16 of this integrally assembled cup 33/protective cylinder 34 is inserted into the connector ring 11 of the cover 1 through the regions defined between the respective pairs of adjacent locking projections 12 while the front or top end of the locking piece 22 rides on the open edge of the connector ring 11 against an elasticity of the elastically flexible leg 21, then the cup 33 and the protective cylinder 34 are rotated together relative to the cover 1 by a predetermined angle until the collar sections 16 of the protective cylinder 34 are locked by the associated locking projections 12 to achieve attachment of the cup 33 and the protective cylinder 34 to the cover 1 and simultaneously the front or top end of the locking piece 22 is fitted into the receiving groove 25 of the cover 1 to prevent the cup 33 and the protective cylinder 34 from further rotation relative to the cover 1, holding these two components in their attached positions.

To detach the cup 33, the front or top end of the locking piece 22 is disengaged from the receiving groove 25 by depressing the rear or lower end thereof, then the cup 33 and the protective cylinder 34 are rotated together to a position at which the collar sections 15 and 16 respectively lie intermediately of the adjacent locking projections 12, and subsequently the protective cylinder 34 is pulled so as to withdraw the collar sections 15 and 16 back through the associated regions defined between the respective pairs of adjacent locking projections 12 and thereby to remove the cup 33 and the protective cylinder 34 together from the cover 1.

Additionally, the elastic connector pieces 29 may be bent outwardly to disengage the respective projections 36 from the associated openings 30 and thereby to separate the cup 33 from the protective cylinder 34.

It will be obvious from the aforegoing description that, according to the second embodiment, the cup 33 and the protective cylinder 34 can be integrally assembled by fitting the projections 36 into the openings 30 of the associated elastic connector pieces 29 and therefore it is also possible to detach the cup 33 and the protective cylinder 34 from the cover 1 at once. In this way, not only the operation of disassemblage but also the operation of assemblage can be performed in a simplified manner. In addition, the cup 33 may be separated from the protective cylinder 34 and thereby it is easily possible to clean the outer periphery of the cup 33.

It should be noted here that, when there is provided a configuration such that the projections 36 are received in the openings 30 of the associated elastic connector pieces 29 in a circumferentially tight relationship, neither the positioning projections 17 nor the positioning notches 18 will be necessary.

Finally, a third embodiment of the present invention incorporated into a lubricator C will be described with reference to FIGS. 6 through 9.

The cover 1 has its lower portion defined by a circular inner periphery and a regular octagonal outer periphery, and this lower portion has its lower end so machined to form a circular connector ring 11. This connector ring 11 is provided on its inner periphery with four locking projections 12 disposed along the open edge thereof at angular intervals of 90°. At a predetermined distance above these locking projections 12 there is provided a circumferential stepped portion 38.

A cup 43 has a circumferential but discontinuous flange 14 on its outer periphery at a level slightly lower than the open edge of the cup 43 and, on this flange 14, four collar sections 15 at angular intervals of 90°. Correspondingly, a protective cylinder 44 is also provided on its outer periphery with four collar sections 16 disposed along the open edge of the protective cylinder 44 similarly at angular intervals of 90°. The open edge of the protective cylinder 44 is adapted to receive, along its inner periphery, an insertion ring 45 which is made of suitable synthetic resin such as polyamide, configured to be tightly fitted on the inner periphery of the protective cylinder 44 when the insertion ring 45 is in its free state, and provided with a groove 46 to facilitate its diameter-reduced deformation. The insertion ring 45 further includes four collar sections 47 disposed along the outer periphery of its upper edge at angular intervals of 90° and correspondingly four projections 48 having respective sloped lower surfaces and disposed below the respective collar sections 47 so that these projections 48 are received in associated openings 49 formed through the peripheral wall of the protective cylinder 44 at positions below the respective collar sections 16. The insertion ring 45 still further includes, at a position on its outer periphery lying intermediately of the one pair of adjacent said collar sections 47, 47 and diametrically opposed to the aforementioned groove 46, a locking projection 50 which has a height sufficiently larger than that of the insertion ring 45 itself to have a lower end projecting downwards beyond the lower edge of the insertion ring 45 and is stepped so as to define its narrower upper end. This locking projection 50 is formed at its lower end with the locking piece 22 which is integrally connected by the elastically flexible leg 21 to said locking projection 50 and has its front or top end adapted to be tilted away from the locking projection 50 by depressing its rear or lower end towards the centre of the insertion ring 45. The protective cylinder 44 includes at a region between one pair of adjacent said collar sections 16, 16 a cut away window 54 in which said locking projection 50 is fit tightly consisting of a relatively wide opening 55 of which the open edge side is partially contracted by a pair of opposed wall portions 56, 56 circumferentially extending towards each other so as to be engaged with the associated stepped portions 53 of the locking projection 50 and an opening 57 extending downwards continuously from said opening 55, which is adapted to accommodate movement of the locking piece 22.

Said locking projection 50 of the insertion ring 45 is further provided in its upper edge with a positioning notch 60 and correspondingly the flange 14 of the cup 43 includes a positioning projection 17 extending downwards from the lower surface thereof at a position intermediate one pair of adjacent said collar sections 15, 15 so as to be received in said notch 60. At two of a total of four positions intermediate the respective pairs of adjacent said collar sections 47 disposed along the upper edge of the insertion ring 45 that are 90° displaced from the locking projection 50, respectively, there are provided connector pieces 62, 62 respectively formed with openings 63. Continuously from these openings 63 there are provided slits 64 formed through the insertion ring 45 to facilitate elastic deformation of the respective connector pieces 62. Correspondingly, at two of a total of four positions intermediate the respective pairs of adjacent said collar sections 15, 15 disposed along the flange 14 of the cup 43 that are displaced 90° from said positioning projection 17, there are provided grooves 35 adapted to receive associated said connector pieces 62. The cup 43 is provided in each of said grooves 35 with a projection 36 having a sloped lower surface so that this projection 36 is received in the associated opening 63 of the connector piece 62. The aforementioned connector ring 11 of the cover 1 is provided in the open edge a pair of receiving grooves 25, 25 at an interval of 180° and lying intermediately of the respective pairs of adjacent said locking projections 12, 12 so as to receive the front or top end of said locking piece 22 provided on the insertion ring 45.

Now a manner in which the cup 43 is attached to the protective cylinder 44 and to the cover 1 will be described.

Figure 8:
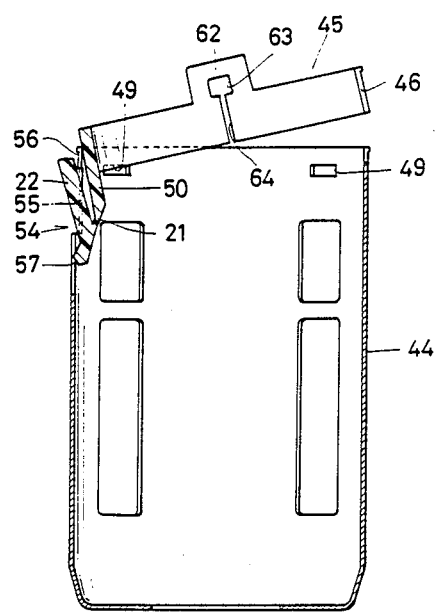
Figure 9:
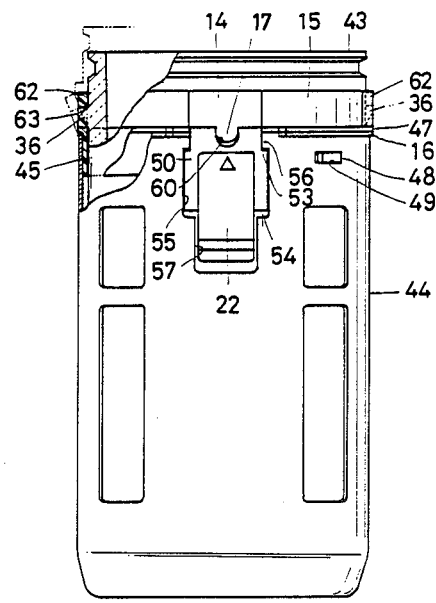

First, the locking projection 50 is aligned with the opening 55 of the cut away window 54 by tilting the insertion ring 45 while the locking piece 22 is slipped through said cut away window 54 of the protective cylinder 44 from the inside to the outside, as seen in FIG. 8, and then the insertion ring 45 is forced into the open edge of the protective cylinder 44. During this operation of insertion, the lower surfaces of the respective projections 48 formed on the insertion ring 45 strike against the open edge of the protective cylinder 44, then the insertion ring 45 is forcibly inserted into said open edge as the insertion ring 45 is subjected to a diameter-reduced deformation with a consequence that the collar sections 47 of the insertion ring 45 bear against the associated collar sections 16 of the protective cylinder 44, and thereupon the projections 48 are received in the associated openings 49 of the protective cylinder 44. Simultaneously, the insertion ring 45 is expanded under its own restoring elasticity and closely bears against the inner periphery of the protective cylinder 44 along the open edge thereof. Thereby the locking projection 50 is tightly received in the opening 55 of the cut away window 54 and thus the insertion ring 45 is fitted on the inner periphery of the protective cylinder 44 along the open edge thereof with the collar sections 47 of the insertion ring 45 resting on the associated collar sections 16 of the protective cylinder 44.

Subsequently, the cup 43 is inserted into the protective cylinder 44 with the positioning projection 17 thereof being aligned with the positioning notch 60 formed in the locking projection 50 of the insertion ring 45 and at the end of this process of insertion the top ends of the connector pieces 62 formed on the insertion ring 45 strike against the lower surfaces of the associated projections 36 formed on the cup 43. The connector pieces 62 are elastically deformed to ride on the associated projections 36 and to enter the associated grooves 35 until the collar sections 15 of the cup 43 strike against the associated collar sections 47 of the insertion ring 45, as indicated by chain lines in FIG. 9. Thereupon the projections 36 are received in the openings 63 of the associated connector pieces 62 and at the same time the positioning projection 17 is engaged with the positioning notch 60 so that the cup 43 and the protective cylinder 44 are integrally assembled, with their associated collar sections 15 and 16 holding the collar sections 47 of the insertion ring 45 therebetween, as indicated by solid line in FIG. 9.

Now this integral assembly of the cup 43, the insertion ring 45 and the protective cylinder 44 is inserted into the cover 1 until by inserting their associated collar sections 15, 47 and 16 through the regions defined between the respective pairs of adjacent locking projections 12 of the cover 1 into the connector ring 11 until said respective collar sections 15, 47 and 16 strike against the stepped portion 38 and the front or top end of the locking piece 22 rides on the open edge of the connector ring 11 against the elasticity of the elastically flexible leg 21. Subsequently, the cup 43 and the protective cylinder 44 are rotated together relative to the cover 1 by a predetermined angle. Thereupon the respective collar sections 15, 47 and 16 are held between the stepped portion 38 and the associated locking projections 12 to achieve attachment of the cup 43/protective cylinder 44 assembly to the cover 1 and simultaneously the front or top end of the locking piece 22 is received in the groove 25 of the cover 1 to prevent the assembly of the cup 43 and the protective cylinder 44 from being rotated relative to the cover 1, holding it in the assembled position.

To detach the cup 43, the front or top end of the locking piece 22 is disengaged from the receiving groove 25 by depressing the rear or lower end thereof, then the cup 43 and the protective cylinder 44 are rotated together relative to the cover 1 to a position at which the collar sections 15, 47 and 16 lie intermediately of the respective pairs of adjacent locking projections 12, and thereafter the protective cylinder 44 is pulled so that the respective collar sections 15, 47 and 16 may be withdrawn through the associated regions defined between the respective pairs of adjacent locking projections 12 and thereby the assembly of the cup 43, the insertion ring 45 and the protective cylinder 44 may be pulled out from the cover 1.

Disassemblage of the cup 43 from the protective cylinder 44 is achieved by bending the respective connector pieces 62 of the insertion ring 45, disengaging the projection 36 of the cup 43 from the opening 63 of said connector piece 62 and then pulling the cup 43. Disassemblage of the insertion ring 45 from the protective cylinder 44 is achieved by diameter-reducing the insertion ring 45, disengaging the respective projections 48 from the associated openings 49 of the protective cylinder 44 and then tilting the insertion ring 45 so that the locking projection 50 may be disengaged from the opening 55 of the cut away window 54 and the locking piece 22 may be slipped out from the outside to the inside of the cut away window 54.

In view of the feature of this third embodiment that not only the projections 48 are fitted into the associated openings 49 but also the stepped locking projection 50 is tightly fit into the opening 55 of the cut away window 54 to fitted the insertion ring 45 on the inner periphery of the protective cylinder 44 along the open edge thereof, there are provided advantages that an accurate positioning can be obtained, on one hand, and a force exerted on the projections 48 can be reduced and possible damages of the projections 48 such as wear and tear thereof can be avoided thereby, since the projecting wall portions 56 exert a force on the stepped portion 53 of the locking piece 50 and the side edges of the opening 55 exert a force on the sides of the locking piece 50 during withdrawal or rotation of the protective cylinder 44 during the process of disassemblage.

As another important feature of this third embodiment, the insertion ring 45 is provided with the locking piece 22 so that the front or top end thereof is received in the groove 25 formed in the cover 1 when the cup 43 and the protective cylinder 44 have been rotated together to the assemblage position and thereby the cup 43 and the protective cylinder 44 are automatically locked in this position. Furthermore, in the disassemblage, this locking effect can be removed merely by depressing the rear or lower end of the locking piece 22.

It should be understood that the present invention may be incorporated into, in addition to the lubricators as in the aforementioned embodiments, a filter for air-actuated device comprising a cup containing therein filter elements and provided with a protective cylinder therearound as well as a cover mounted thereon.

We claim:

1. In a detachable attaching mechanism for a cup of a lubricator used with an air-actuated device comprising said cup containing therein a quantity of lubrication oil, means to supply a quantity of lubrication oil from said cup into an air stream flowing from an inlet to an outlet, a cover mounted on said cup and a protective cylinder mounted around said cup, the improvement.

that a connector ring projecting downward from the under side of said cover is provided in its inner periphery with a plurality of locking projections disposed at predetermined angular intervals circumferentially;

that said cup and said protective cylinder are respectively provided with a positioning notch and a positioning projection adapted to be engaged with each other and thereby to relatively position said cup and said protective cylinder circumferentially;

that said cup and said protective cylinder are provided on respective outer peripheries with a plurality of collar sections disposed at positions along respective upper edges corresponding to said angular intervals of adjacent said locking projections formed on said cover so that said collar sections of the cup and the protective cylinder interengage one another;

that said collar sections of said cup and said protective cylinder are adapted to be inserted through said angular intervals of said locking projections of said cover into said connector ring and then to be engaged with the associated said locking projections upon rotation of said cup and said protective cylinder relative to the cover by a predetermined angle whereby to achieve attachment of said cup and said protective cylinder to the cover, that said protective cylinder is provided on its outer periphery with a locking piece adapted to have its upper end tilted outwardly away from the outer periphery of said protective cylinder by depressing its lower end and said locking piece is mounted with interposition of an elastically flexible leg on said outer periphery of said protective cylinder; and that said cover is provided in its outer periphery with receiving means adapted to receive the upper end of said locking piece upon completion of attachment of said cup and said protective cylinder to said cover and thereby to prevent rotation of said cup and said protective cylinder relative to said cover.

2. A detachable attaching mechanism for a cup of a lubricator used with an air-actuated device according to claim 1, wherein said cup is provided on its outer periphery with locking projections and said protective cylinder is correspondingly provided with elastic connector pieces having respective openings into which associated said projections are received.

3. A detachable attaching mechanism for a cup of a lubricator used with an air-actuated device according to claim 1, wherein said protective cylinder
comprises a metallic cylinder and said positioning projection and said locking piece are formed on an insertion ring which is made of synthetic resin and is detachably attached to an upper end of said metallic cylinder.

4. A detachable attaching mechanism for an air-actuated device comprising a cup, a cover mounted on said cup and a protective cylinder surrounding said cup,
said cover having an air passage therein and having a connector ring projecting downwards from an under side of said cover and provided on its inner periphery with a plurality of locking projections disposed at predetermined angular intervals circumferentially,
said cup and said protective cylinder being respectively provided with a positioning notch and a positioning projection adapted to be engaged with one another to position said cup and said protective cylinder relative to one another circumferentially,
said cup and said protective cylinder being provided on respective outer peripheries with a plurality of collar sections disposed at positions along respective upper edges corresponding to said angular intervals of adjacent ones of said locking projections formed on said connector ring of said cover so that collar sections of said cup and said protective cylinder interengage over another,
said collar sections of said cup and said protective cylinder being insertable through said angular intervals of said locking projections of said connector ring of said cover into said connector ring and thereupon being engaged with respective ones of said locking projections upon rotation of said cup and said protective cylinder relative to said cover by a predetermined angle thereby to effect attachment of said cup and said protective cylinder to said cover,
said protective cylinder being provided on its outer periphery with a locking piece adjusted to have its upper end tilted outwardly away from the outer periphery of said protective cylinder by depressing its lower end and said locking piece being mounted with interposition of an elastically flexible leg on said outer periphery of said protective cylinder, and
said cover being provided in its outer periphery with means for receiving the upper end of said lacking piece upon completion of attachment of said cup and said protective cylinder to said cover and thereby prevent rotation of said cup and protective cylinder relative to said cover.

5. A detachable attaching mechanism according to claim 4 in which at least an upper part of said protective cylinder is formed of plastic material and wherein said locking piece is integral with said elastically flexible leg which is integral with said upper part of said protective cylinder.

* * * * *